United States Patent Office 3,432,250
Patented Mar. 11, 1969

3,432,250
CHEMICAL PROCESS FOR TREATING POLYMERS WITH ACIDS
Robert Miller, Columbia, S.C., and Milton Farber, Verona, and Frederick C. Loveless, Oakland, N.J., assignors to Uniroyal, Inc., a corporation of New Jersey
No Drawing. Continuation-in-part of applications Ser. No. 177,720, Mar. 6, 1962, and Ser. No. 290,291, June 25, 1963. This application Mar. 16, 1964, Ser. No. 352,317
U.S. Cl. 8—29                                                          18 Claims
Int. Cl. D06p 3/66, 3/20; C09b 65/00

ABSTRACT OF THE DISCLOSURE

The present invention relates to a shaped article of commerce comprising a composition of an intralinear polyester high polymer, between about 0.5 and 10% of a highly polar basic nitrogen containing polymer and the products of interaction of said basic nitrogen containing polymer with an acidic reagent capable of reacting with said basic polymer, the acidic reagent having been infused into the polyester after shaping.

---

This invention is directed to the production of dye-receptive, shaped polyesters. It is accomplished by means of two changes in these polymers: first, by incorporation of a minor amount of an inherently dye-receptive, highly polar basic polymer in the polyester; second, by treating this mixture with an acidic chemical capable of diffusing into the mass and reacting with the basic polymer. The treated material is thereby made dyeable by conventional techniques. The invention provides a cheap, practical method of rendering these difficult dyeably polyesters highly dye-receptive. The dyed articles are colorfast, and intensely and uniformly dyed.

This application is a continuation-in-part of our co-pending applications Ser. Nos. 177,720 filed Mar. 6, 1962 and 290,291 filed June 25, 1963, now abandoned. As is shown in those applications, polyolefin fibers containing basic dye receptors such as polyvinylpyridine or polyamides can be made permeable to water-soluble ionized dyes by treatment of such fibers with acidic materials. It has now been found that the same technique may be applied to polyesters.

Polyesters are difficult to dye, as are polyolefins, because their chemical structure lacks atoms or groups, known as dye receptors, to which dye molecules may become attached.

It is known in the prior art to add dye receptor materials, particularly various nitrogen base polymers, to a fiber, either before or after it is extruded to make it dyeable. However, in these cases, when minor amounts of nitrogen base polymer, i.e., less than 10%, are incorporated in a polyester fiber, it is undyeable with acid, metallized and direct dyes, except for the production of pale tints. Similarly, treatment of a polyester fiber containing no nitrogen-base polymer additive with acidic materials produces no increase in dyeability with the above dye classes. Yet when these two techniques are combined, the fiber is highly dyeable. The present invention has thus produced a result which is totally unexpected and which is completely unique: mixtures containing very small amounts of dye receptor, amounts which ordinarily confer little or no dyeability, are made very highly dyeable. We find that the preceding is true also when the nitrogen base dye receptor is present as a graft copolymer rather than an additive.

Dyeability in difficult to dye fibers may be achieved by means of an additive alone, but in these cases it has been necessary to use large quantities of additive, i.e., over 10%. With large amounts of additive present, the resulting fiber suffers great disadvantages. Physical properties are degraded, the material, because of incompatibility of the mixed polymers, is difficult or impossible to extrude and process, the fiber is rough and brittle, and the added expense is great. It would thus be highly desirable to be able to achieve dyeability in such fibers with the addition of less than 10% of added basic polymer. Our invention represents a practical method for achieving this end.

The reason for the difficulty in dyeing blends of polyester with less than 10% of a polar (i.e., dye-receptive) polymer stems from the fact that the plastic, blended mixtures behave as though the polar polymer had become encapsulated or shielded in some manner, so that water-soluble, ionized dyes, comprising the large classes of acid dyes, which includes milling or strong acid dyes, direct dyes, metallized dyes, reactive dyes, etc. cannot penetrate to them. Treatment of these blends with acidic materials makes them permeable to the above dyes.

We have discovered that drawn or undrawn polyester filaments, yarns, and fabric material containing from 0.5 to 10% of a nitrogen-base polymer can be made highly receptive to the dyes mentioned above by treating the material containing such polymer for a short time with certain acidic chemical reagents, which are capable of dissolving in or diffusing into the polyester where they react with the nitrogen-base polymer therein to form an acid-base addition product. The material so treated may then be dyed in any conventional manner with the above-named dyes.

The term polyester is used herein to refer to the matrix material of which the fiber is largely composed, being condensation polymers of dihydric alcohols with organo-dibasic acids, particularly dicarboxylic acids, and self-condensation polymers of omega-hydroxy carboxylic acids. The preferred materials in our invention are poly(ethylene terephthalate), poly(ethylene terephthalateisophthalate), and poly(1,4-cyclohexylenedimethylene terephthalate), and further discussion will be mainly in terms of these representative polyesters. It will be understood that the invention is applicable to all film- and fiber-forming polyesters, in which the ester linkages are intralinear, including poly(alkylene alkanedioates), poly(cycloalkylenedimethylene alkanedioates), poly(alkylene arenedioates,) poly(cycloalkylenedimethylene arenedioates), and analogous materials. Examples of the above-named polyesters are respectively, poly(ethylene adipate), poly(1,4-cyclohexylenedimethylene adipate), poly(ethylene terephthalate), and poly(1,4-cyclohexylenedimethylene terephthalate). Physically, the polyester may take the form of filaments, yarns, fabrics and films, or other shaped or molded form presenting a high ratio of surface to volume.

Examples of the dye receptor polymers which we incorporate in the polyesters are thermoplastic basic nitrogen-containing materials of the following types:

(1) Vinyl-substituted mono- and polycyclic pyridine bases, either homopolymers or copolymers, including graft copolymers.

(2) Polyamides, including condensation homopolymers and copolymers, in which the amide groups are an integral part of the polymer chain, and addition homopolymers and copolymers having pendant groups containing or consisting of amide groups.

(3) Amine polymers, including condensation homopolymers and copolymers, in which the amine group is an integral part of the polymer chain, and additional homopolymers and copolymers having pendant groups which include or consist of amine groups.

Other basic nitrogen polymers which may be used in our invention are polyurethanes, polyureas, poly(vinylcarbazoles), aniline-formaldehyde resins, etc.

The basic nitrogen polymers employed are not extractable from their mixture with the polyester under the conditions of treating and dyeing used. Thus, after a one-hour extraction with boiling water at a pH of 3, at least 10% of the originally added nitrogen polymer should remain in the polyester fiber. The amount of the basic nitrogen polymer added to the polyester should be sufficient so that, after the acid treatment of the invention it will bind the amount of dye required to produce the shade desired.

The vinyl-substituted mono- and polycyclic pyridine base dye-receptor polymer incorporated in the polyester in accordance with the invention is present either as a homopolymer, a copolymer with another vinyl monomer copolymerizable therewith or as a graft copolymer with a preformed high polymer. The vinyl-substituted mono- and polycyclic pyridine base dye-receptor polymers used are those based, for example, on monovinylpyridines and monovinylquinolines.

The monovinylpyridines useful in making the above named dye-receptive polymers employed in the invention include 2-vinylpyridine, 3-vinylpyridine, 4-vinylpyridine, 5-methyl-2-vinylpyridine, 2-methyl-5-vinylpyridine, 2-ethyl-6-vinylpyridine, 2-isopropenylpyridine, etc. Polymerizable olefinic monomers with which the monovinylpyridine may be copolymerized include acrylic and methacrylic esters typified by ethyl acrylate and methyl methacrylate, vinyl aryl hydrocarbons typified by styrene and vinyltoluenes, and butadiene-1,3. Alternatively, the monovinylpyridine may be graft-copolymerized, by well-known methods, with a previously formed linear high polymer, typified by polyethylene, polypropylene, polyethylene terephthalate, polystyrene, and polybutadiene. It is always desirable that the basic polymer contain no more than a minor proportion of material copolymerized with the monovinylpyridine, since only the pyridine portion of the polymer additive is active in enhancing the dyeability of the polyester.

The polyamides useful as the dye-receptors employed in this invention include homopolyamides such as poly(hexamethylene adipamide), poly(hexamethylene sebacamide), polypyrrolidinone, polycaprolactam, polyenantholactam, and copolyamides such as Zytel 61 (du Pont), an interpolymer of hexamethylene adipamide and hexamethylene sebacamide with caprolactam.

As examples of vinyl polymers with pendant groups consisting of or containing amide groups there are the substituted poly(vinylpyrrolidinones), e.g., N-vinyl-3-alkyl (such as ethyl) pyrrolidinone, and N-substituted polyacrylamides, e.g., N-butylacrylamide. Also useable are copolymers of the amide-containing vinyl monomers with other olefinic monomers such as acrylic and methacrylic esters typified by ethyl acrylate and methyl methacrylate, vinyl aryl hydrocarbons typified by styrene and vinyltoluenes, and butadiene-1,3. Alternatively, the vinylpyrrolidinones or acrylamides may be graft-copolymerized by well-known methods, with a previously formed linear high polymer, typified by polyethylene, polypropylene, poly(ethylene terephthalate), polystyrene, and polybutadiene. It is always desirable that the basic polymer contain no more than a minor proportion of material copolymerized with the vinylpyrrolidinones or acrylamides, since only the amide portion of the polymer additive is active in enhancing the dyeability of the polyester.

As an example of amine polymers useful as the dye receptor employed in this invention there are the condensation products of epihalohydrins or dihaloparaffins with one or more amines, such as those disclosed in Belgium Patent No. 606,306, exemplified by the condensation product of dodecylamine, piperazine and epichlorohydrin; as examples of addition polymers with pendant groups consisting of or containing amines there are the reaction product of a styrene-maleic anhydride copolymer with gamma-(dimethylamino)-propylamine (the reaction product being a polyamino-polyimide), and styrene-allyl-amine copolymers such as those disclosed in U.S. Patent No. 2,456,428.

In those cases where it is undesirable to exert crosslinking action on the polyester, the receptors should contain no primary amino or other polyfunctional groups which might act in this manner.

Examples of the acidic chemical reagents used in the invention are the following:

(1) Mineral acids, such as hydrochloric acid, hydrobromic acid, sulfurous acid, nitric acid, sulfuric acid, phosphoric acid and perchloric acid. The last three acids, highly ionic materials, are effectively employed at high application temperatures (>60° C.) as shown herebelow.

(2) The anhydrous acid gases corresponding to the mineral acids defined above, whether the undissociated acid or the acid anhydride, illustrated by hydrogen chloride, hydrogen bromide, sulfur dioxide, and nitrogen dioxide. A source of hydrogen ions such as water in or on the polyester is used in those cases where none is present in the reagent.

(3) Organo-carboxylic acids, including aliphatic and aromatic acids, mono-carboxylic and dicarboxylic acids, saturated and unsaturated acids. Suitable acids are exemplified by formic, acetic, propionic, stearic, and other alkanoic acids in the $C_{1-18}$ range; undecylenic, oleic, benzoic, salicylic, oxalic, succinic, adipic, phthalic, bromoacetic, crloroacetic and lactic acids. The organic acid may be used in its liquid or molten state (when its melting point is below the temperature selected for the fiber treatment), or in solution in a volatile organic solvent such as benzene or toluene. It may be used in water solution—provided that the solubility of the acid in water is sufficient to provide a solution containing at least 20% (by weight) of the acid solute, and provided that the acid is used at no less than 20% concentration. Greater dilution with water greatly reduces diffusion of the organic acid into polypropylene and results in very low dyeability of the fiber.

(4) Those halide compounds which liberate hydrohalic acid on contact with water at the temperature of the treatment. Examples of such compounds are:

(a) Halides of non-metallic elements such as phosphorus and sulfur (exemplified by $PCl_3$, $POCl_3$, $SCl_2$, $S_2Cl_2$, $SOCl_2$, $SO_2Cl_2$).

(b) Metal halides such as the halides of zinc, tin and aluminum.

(c) Acid halides of organic acids of the class defined in section 3, and organosulfonyl halides, typified by acetyl, benzoyl, adipyl, and p-toluenesulfonyl chlorides.

(d) Activated alkyl halides containing a conjugated grouping which enhances the reactivity of the halogen atom; e.g., allylic and benzylic halides (such as chlorides).

(5) Other compounds capable of forming complexes or additon compounds with basic nitrogen polymers, e.g., boron trifluoride and phenol.

In all these treatments, hydrogen ions are present either as part of the acid itself, e.g., nitric or acetic acids, or they may be furnished by water in or on the fiber, in the amount of at least 1% (OWF).

Representative of those reagents which have the greatest effect in the process of our invention, from the standpoint of increasing the dyeability of polyesters containing up to 10% of a vinylpyridine base polymer or a polyamine dye receptor are acetic acid, hydrochloric acid, thionyl chloride, and p-toluenesulfonyl chloride.

Representative of those reagents which have the greatest effect in the process of our invention, from the standpoint of increasing the dyeability of polyesters containing up to 10% of a polyamide dye receptor, are formic acid, hydrochloric acid, and phosphorous oxychloride.

The temperature range within which our chemical treatment of the polymer-blend shaped material is carried out is not critical but is of course below the softening temperature of the particular polyester employed. For polyethylene terephthalate this would be below 250°–260° C., its melting point. In practice, however, with drawn fibers of polyethylene terephthalate for instance, which shrink greatly at temperatures above 200° C., temperatures not greater than 200° C. would of course be used to avoid such shrinkage. There is likewise no critical lower limit, but the lowest useful temperature will simply be dictated by rates of diffusion and reaction, and in many cases 0° C. represents a practical lower value. An additional factor is that of crystallinity. In an undrawn amorphous polyethylene terephthalate-isophthalate copolymer yarn, treatment at temperatures between 0° and 60° C. can be used. When this same yarn is drawn and fully crystallized, however, best results are obtained by carrying out the treatment at temperatures above the second order transition temperature, which for polyethylene terephthalate is ca. 80° C. For drawn fiber, therefore, the preferred temperature range is from the second order transition temperature to the shrinkage temperature (i.e., from 80° to 200° C. for polyethylene terephthalate and its isophthalate copolymer).

The duration of the chemical treatment may vary from 1 second to 3 hours, depending on the reagent and the temperature selected. Most often a time of from 0.5 to 15 minutes, using temperatures in the range from about 80° to about 200° C., is satisfactory and sufficient for liquid reagents and solutions. A somewhat longer time of exposure may be required when the reagent is a gas.

Although our invention is applicable in the range of 0.5 to 10% of nitrogen base polymer content in the fiber, we prefer to employ the range of 0.5–5%, depending upon the nitrogen content of the additive. This is advantageous because of the high cost of the nitrogen base polymers and because it minimizes any undesirable effects on the physical properties of the fiber. The presence of 0.5 to 5% of nitrogen base polymer is usually sufficient to exhaust a 1% (OWF; the abbreviation "OWF" used herein means "on the weight of the fiber," in the parlance of the dyers' trade) dye bath, which gives deep colors with many dyes.

The poly(vinylpyridine) used in the following examples included suspension polymers and solution polymers of 2-vinylpyridine, the polymerization initiator used having been azobisisobutyronitrile. The polymers had an intrinsic viscosity in the range from 0.2 to 2.0, measured in pyridine at 30° C. The polyesters used were polyethylene terephthalate and the terephthalate-isophthalate copolymer, with intrinsic viscosities of about 0.5–1.0. The mixtures of polyester and the poly(vinylpyridine) were made by blending, tumbling or any convenient method. The mixtures were then spun into yarns by conventional melt-spinning.

The acid treatment step may be effected either before or after the yarn has been drawn—most conveniently after the drawing. Hanks, coils, and knit fabrics of the resulting filaments were variously subjected to treatments with acidic reagents according to the invention, and were thereafter dyed, as described in the detailed examples which follow:

Example 1

A mixture containing 3 parts of poly(2-vinylpyridine) in 100 parts of a poly(ethylene terephthalate-isophthalate) copolymer was spun into 4-filament yarn at a temperature of 470° F. Coils of the undrawn yarn were treated as follows:
(1) None.
(2) Soaked in acetic acid for 3 minutes at 60° C.
(3) Soaked in phosphorus oxychloride for 2 minutes at 50° C.
(4) Soaked in adipyl chloride for 2 minutes at 50° C.

The last two samples were first rinsed in acetone and they were all then rinsed in water and scoured. The yarns were dyed by immersing them for 1 hour at 85° C. in a dye bath containing 1% [OWF] of the dye and a small amount of nonylphenol-ethylene oxide condensate. A deep orange color was produced in the acid-treated samples, with Capracyl Orange R which is the ½ chrome complex of 1-phenyl-3 methyl-4-(2'-hydroxy-5' sulfonamido-) phenylazo-5-pyrazolone also known as Acid Orange 60, whereas the untreated first sample was tinted only a faint pink.

Example 2

Skeins of undrawn 10-filament yarn spun from the same co-polyester-poly(2-vinylpyridine) mixture as in Example 1, as well as skeins of this same yarn which had been drawn 5.5:1 over a hot pin were soaked in phosphorous trichloride for 2 minutes at 50° C. The samples were then rinsed in acetone followed by water and, after scouring, were dyed with either Capracyl Orange R (Acid Orange 60) or Alizarine Sky Blue B having Color Index Number (C.I. No. 62105) and also known as (Acid Blue 78). The intensities of dyeing obtained were:

Undrawn: Deep orange and blue colors, compared to light orange and blue with untreated yarn.

Drawn: Medium orange and blue colors, compared to almost colorless with untreated yarn.

Example 3

A skein of the same drawn yarn used in Example 2 was soaked in phosphorus oxychloride for 2 minutes at 90° C., followed by rinsing in acetone and then in water. When dyed with Capracyl Orange R (Acid Orange 60) in the same manner as in Example 2, a much deeper color resulted than was obtained with the phosphorus trichloride treatment at 50° C. in Example 2.

When untreated skeins of this same yarn were soaked in acetic acid for 4 minutes at 60° C. or at 90° C., rinsed in water, and dyed with Capracyl Orange R, a much deeper coloration was obtained from the treatment at 90° C.

Example 4

A drawn, 40-filament, 441 denier polyethylene terephthalate yarn containing 3.0% of poly(2-vinylpyridine) was knitted into a tubular fabric. A sample of this fabric was soaked in acetic acid for 4 minutes at 110° C. and rinsed in water. After scouring, it could then be dyed to deep colors with the two dyes used in Example 2. An untreated sample of this yarn was only barely tinted when dyed with these dyes.

Example 5

Samples of tubular knit fabric from the yarn used in Example 3 were soaked in the materials listed below:

| Reagent | Solvent | Time (minutes) | Temp. (° C.) |
|---|---|---|---|
| Conc. hydrochloric acid | | 4 | 90 |
| Formic acid | | 4 | 90 |
| Propionic acid | | 4 | 90 |
| Benzoic acid | Xylene (sat. soln.) | 4 | 90 |
| Bromoacetic acid | Water (1:1) | 4 | 90 |
| Oxalic acid | Xylene (sat. soln.) | 4 | 90 |
| Benzoyl chloride | | 4 | 90 |
| Adipyl chloride | | 4 | 90 |
| Acetyl chloride | Xylene (25% Solution) | 4 | 90 |
| p-Toluenesulfonyl chloride | | 4 | 90 |
| Phenol | Xylene (5% Solution) | 4 | 90 |
| Aluminum chloride | CHClBr₂ | 4 | 90 |
| Stannous chloride | CHClBr₂ | 4 | 90 |
| Zinc chloride | CHClBr₂ | 4 | 90 |
| Allyl bromide | Xylene (1:1) | 4 | 90 |
| Benzyl bromide | | 4 | 90 |
| Boron trifluoride etherate | | 4 | 90 |
| Sulfur monochloride | | 4 | 90 |
| Thionyl chloride | | 4 | 75 |
| Nitrogen dioxide | | 15 | 90 |
| Sulfuric acid | Water (1:1) | 15 | 120 |
| Phosphoric acid | | 15 | 160 |
| Perchloric acid | | 15 | 80 |

If the treating agent was water-immiscible, the sample was rinsed in xylene and then methanol after the treatment. All were then scoured in 0.1% [OWF] nonylphenol-ethylene oxide condensate. They all dyed to deep shades with the acid dye Alizarine Sky Blue B (Acid Blue 78)

and the neutral premetallized dye Capracyl Orange R (Acid Orange 60). An untreated sample was only faintly tinted when dyed in a similar manner.

Example 6

A drawn, 40-filament, 436 denier yarn spun from the same co-polyester as in Example 1 and containing 3.0% of poly(2-vinylpyridine) was knitted into a tubular fabric. Samples of this fabric were soaked in the chemicals listed below:

| Reagent | Solvent | Time (min.) | Temp. (° C.) |
| --- | --- | --- | --- |
| Stearic acid | | 15 | 160 |
| Oleic acid | | 15 | 160 |
| Undecylenic acid | | 15 | 120 |
| Adipic acid | Xylene (sat. soln.) | 15 | 120 |
| Salicylic acid | Xylene (sat. soln.) | 15 | 120 |
| Nitric acid | Water (1:1) | 15 | 90 |
| Phthalic acid | Xylene (sat. soln.) | 15 | 120 |

Where the treating agent was immiscible with water, the samples were rinsed in xylene and then in methanol. After being scoured as in Example 5, they all dyed to a deep orange color with Capracyl Orange R (Acid Orange 60). An untreated sample dyed to only a pale orange with this same dye.

It will be obvious to a person skilled in the art that the undyed polyester treated in accordance with the invention is not a mere transitory product but is a useful article of commerce in itself, capable of being manufactured and sold to textile producers or others who carry out the dyeing of the treated polyester. It will be understood that not only Capracyl Orange R (Acid Orange 60), a premetallized dye, and Alizarine Sky Blue B (Acid Blue 78), a milling acid dye, may be used in the invention, but any other suitable conventional dyes may be used. Thus, the fiber treated according to the invention is highly dyeable with all dyes in the acid class, including such as Reactone Red 2B (Geigy), a reactive dye, Pontamine Fast Yellow 4GL (C.I. No. 29000) (Direct Yellow 44), a direct dye, and Alizarine Red S (C.I. No. 58005) (Mordant Red 3), a mordant acid dye. The dye identifying data corresponding to the Color Index Numbers cited in this specification are found in The Color Index, 2nd edition, American Association of Textile Chemists and Colorists (1956). It is desired to emphasize expressly that chlorine or hypochlorous acid are not suitable acids for use in the method of the invention because their use gives a product which is not fast to light. It is desired to make reference to the fact that the atactic type of vinylpyridine polymer is lower melting than the isotactic kind and therefore the atactic vinylpyridine polymer can be blended with the polyester with greater facility than isotactic vinylpyridine polymer. The mere use of dilute aqueous acetic acid in the dye bath, as, for example, in Belgium Patent 593,667, does not serve the purposes of the present invention wherein the acid treatment is undertaken as a separate step prior to the dyeing step (as distinguished from simultaneous exposure to acid and dye) and wherein the acetic acid is applied either in glacial (undiluted) form, or from a non-aqueous solution of glacial acetic acid in a volatile organic solvent, or from a concentrated (at least 20%) aqueous solution as distinguished from a dilute aqueous solution. In dilute aqueous solution, acetic acid does not diffuse into the polymer mixture nor react with the basic polymer sufficiently for purposes of the invention.

Having thus described our invention, what we claim and desire to protect by Letters Patent is:

1. A shaped article of commerce which is readily dyeable with acid dyes comprising a fiber-forming mixture of an intralinear polyester high polymer blended with between about 0.5% and 10% of a thermoplastic basic nitrogen-containing polymer capable of fixing acid type dyes, and the products of interaction of said basic polymer with an acidic reagent capable of reacting to form an acid-base addition product with said basic polymer, the acid reagent having been applied and infused into the polyester blend after shaping.

2. The shaped article defined in claim 1 wherein the acidic reagent is selected from the group consisting of:
   (I) mineral acids and the acid halides thereof,
   (II) gaseous acid anhydrides of mineral acids,
   (III) organo-carboxylic acid,
   (IV) halides of non-metallic elements which liberate hydrohalic acid on contact with water,
   (V) metal halides which liberate hydrohalic acid on contact with water,
   (VI) allylic halides,
   (VII) benzylic halides,
   (VIII) boron trifluoride
   (IX) phenol.

3. The shaped article defined in claim 2 wherein the article is a filamentary article.

4. The shaped article of claim 2 wherein the polyester is a linear condensation polymer of a dihydric alcohol and a dicarboxylic acid, and the thermoplastic basic nitrogen containing polymer is selected from the group consisting of
   (I) vinylpyridine polymers
   (II) polyamides, and
   (III) amine polymers the said nitrogen containing polymer being substantially non-extractable from said article by a treatment with boiling water for one hour at pH 3.

5. The filamentary material defined in claim 3 wherein the polyester is a linear condensation polymer of a dihydric alcohol and a dicarboxylic acid, and the nitrogen-containing polymer is a monovinylpyridine polymer.

6. The filamentary material defined in claim 5 in which the said polyester is selected from the group consisting of poly(ethylene terephthalate), poly(ethylene terephthalate-isophthalate), and poly(1,4-cyclohexylenedimethylene terephthalate).

7. The filamentary material defined in claim 3 wherein the polyester is a linear condensation polymer of a dihydric alcohol and a dicarboxylic acid, and the nitrogen-containing polymer is a polyamide.

8. The filamentary material defined in claim 3 wherein the polyester is a linear condensation polymer of a dihydric alcohol and a dicarboxylic acid, and the nitrogen-containing polymer is an amine polymer.

9. A dyed article comprising the article defined in claim 1 infused with a dye selected from the class of acid dyes, comprising strong acid dyes, direct dyes, metallized dyes, mordant dyes and reactive dyes.

10. A dyed filamentary material comprising the filamentary material of claim 5 infused with an acid dye.

11. The filamentary material defined in claim 6 wherein the monovinylpyridine polymer is poly(2-vinylpyridine).

12. The process of making the article defined in claim 1 intensely dyeable with acid type dyes which comprises in sequence the steps of blending with a polyester high polymer between about 0.5% and 10% of a thermoplastic basic nitrogen-containing polymer, forming the resulting blend into a shaped article, and applying and infusing into said article an acidic reagent capable of reacting to form an acid-base addition product with said basic polymer.

13. The process of making the article defined in claim 12 wherein the acidic reagent is selected from the group consisting of:
   (I) mineral acids and the acid halides thereof,
   (II) gaseous acid anhydrides of mineral acids,
   (III) organo-carboxylic acids,
   (IV) halides of non-metallic elements which liberate hydrohalic acid on contact with water,
   (V) metal halides which liberate hydrohalic acid on contact with water,
   (VI) allylic halides, (VII) benzylic halides,
(VIII) boron trifluoride,
(IX) phenol.

14. A method of making polyester fiber having a high degree of dyeability with acid type dyes comprising a polyester high polymer with from 0.5 to 10% of a nitrogen-base polymer selected from the group consisting of:
(I) vinylpyridine polymers,
(II) polyamides, and
(III) amine polymers,
the said nitrogen base polymer being substantially non-extractable from said article by a treatment with boiling water for one hour at pH 3, thereafter shaping the resulting blend into fiber, and subsequently infusing at least the surface of the fiber, in the presence of water, with an acidic reagent which is capable of reacting to form an acid-base addition product with said basic polymer and which is selected from the group consisting of:
(I) mineral acids and the acid halides thereof,
(II) gaseous acid anhydrides of mineral acids,
(III) organo-carboxylic acids,
(IV) halides of non-metallic elements which liberate hydrohalic acid on contact with water,
(V) metal halides which liberate hydrohalic acid on contact with water,
(VI) allylic halides,
(VII) benzylic halides,
(VIII) boron trifluoride,
(IX) phenol.

15. The method of making the polyester fiber defined in claim 14 wherein the polyester is a linear condensation polymer of a dihydric alcohol and a dicarboxylic acid, and the basic nitrogen containing polymer is a monovinylpyridine polymer.

16. The method of making the polyester fiber defined in claim 14 wherein the polyester is a condensation polymer of a dihydric alcohol and a dicarboxylic acid and the nitrogen-containing polymer is a polyamide.

17. The method of making the polyester fiber defined in claim 14 wherein the polyester is a condensation polymer of a dihydric alcohol and a dicarboxylic acid and the basic-nitrogen-containing polymer is an amine polymer.

18. The method defined in claim 15, in which the said polyester is selected from poly(ethylene terephthalate), poly(ethylene terephthalate-isophthalate), and poly(1,4-cyclohexylenedimethylene terephthalate), and the said vinylpyridine polymer is a poly(2-vinylpyridine).

References Cited
UNITED STATES PATENTS

| | | | |
|---|---|---|---|
| 2,708,617 | 5/1955 | Magat et al. | 18—54 |
| 3,083,118 | 3/1963 | Bridgeford | 117—47 |

J. TRAVIS BROWN, *Primary Examiner.*

J. P. BRAMMER, *Assistant Examiner.*

U.S. Cl. X.R.

8—100, 55; 260—850